United States Patent
Qvarth

(10) Patent No.: US 6,290,436 B1
(45) Date of Patent: Sep. 18, 2001

(54) CUTTING INSERT FOR ROTATING CUTTING TOOLS

(75) Inventor: Ingemar Qvarth, Valbo (SE)

(73) Assignee: Sandvik Aktiebolaget, Sandviken (SE)

( * ) Notice: Subject to any disclaimer, the term of this patent is extended or adjusted under 35 U.S.C. 154(b) by 0 days.

(21) Appl. No.: 09/427,483

(22) Filed: Oct. 27, 1999

(30) Foreign Application Priority Data

Oct. 27, 1998 (SE) ..................................................... 9803674

(51) Int. Cl.$^7$ ............................... B23B 27/00; B23C 5/20
(52) U.S. Cl. ............................ 407/113; 407/114; 407/116
(58) Field of Search .................................... 407/113, 114, 407/115, 111, 112, 101, 102, 107, 108, 109, 62, 116, 117

(56) References Cited

U.S. PATENT DOCUMENTS

| | | | |
|---|---|---|---|
| 1,851,613 | * | 3/1932 | Albee ....................................... 407/37 |
| 3,246,382 | * | 4/1966 | Zierden ................................... 407/107 |
| 3,887,974 | * | 6/1975 | Sorice ..................................... 407/113 |
| 3,889,331 | * | 6/1975 | Grungras ................................. 407/92 |
| 4,010,526 | * | 3/1977 | Shephard .................................. 407/6 |
| 4,271,882 | * | 6/1981 | Valo .................................. 407/113 X |
| 4,396,315 | | 8/1983 | Middleton . |
| 5,193,946 | * | 3/1993 | Arai et al. ............................. 407/113 |
| 5,494,383 | * | 2/1996 | Kress et al. ........................... 408/231 |
| 5,542,795 | * | 8/1996 | Mitchell ................................. 407/35 |
| 5,558,142 | | 9/1996 | Ehrle et al. . |
| 5,658,101 | | 8/1997 | Hammer . |
| 5,904,193 | * | 5/1999 | Kellner ................................. 144/230 |
| 5,951,212 | * | 9/1999 | Emoto et al. ........................... 407/34 |
| 6,024,519 | * | 2/2000 | Okui et al. ............................ 407/113 |
| 6,048,140 | * | 4/2000 | Johnson ................................. 407/42 |
| 6,058,989 | * | 5/2000 | LaGrange et al. ............... 407/113 X |

* cited by examiner

*Primary Examiner*—Henry Tsai
(74) *Attorney, Agent, or Firm*—Burns, Doane, Swecker & Mathis, L.L.P.

(57) ABSTRACT

A cutting insert for rotating cutting tools for chip-breaking metal machining is delimited by atop side, adjacent to which there are cutting edges, an opposed bottom side and one or several relief surfaces. In the topside is provided a first depression for accommodating a male-like protrusion on a clamping element for fixing of the cutting insert. In the bottom side is provided a female recess for cooperating with a male means on the seat of the cutting insert. By these male-female joints, it is guaranteed that the cutting insert is not flung out from the appurtenant seat, when it is submitted to extremely large centrifugal forces.

16 Claims, 2 Drawing Sheets

CUTTING INSERT FOR ROTATING CUTTING TOOLS

BACKGROUND AND SUMMARY

This invention relates to a cutting insert for rotating cutting tools of the type intended for chip-breaking metal machining. The rotating cutting tools include a part with a seat opening radially outwards for accommodating a cutting insert. The cutting insert is delimited by a top side, one or more cutting edges adjacent to the top side, an opposed bottom side, and one or more relief surfaces extending between the top side and the bottom side. The cutting insert is arranged to be fixed into the seat by means of a clamping element that may be pressed against its top side. A female recess and/or a male means is formed in the bottom side of the insert for co-operation with a suitable male means and/or a female recess in the tool part.

In the technology of chip-breaking metal machining by means of rotating cutting tools, there is a trend in development aimed at making it possible to run the tools at very high speeds of rotation. More specifically, this trend is directed to reducing a minimum the time required for different machining operations. Thus, in professional circles one reckons on running, e.g., milling cutters, bores and the like, at speeds of rotation up to the range of 20,000 to 30,000 rpm. In modem cutting tools, one uses replaceable cutting inserts made of extremely hard and wear-resistant materials, such as cemented carbide, ceramics or other compositions, e.g., with inclusions of diamond and cubic bore nitride, as means of machining. In for instance milling tools, such cutting inserts are often held in place by clamping elements, primarily wedges, instead of by means of screws. In the cases when the cutting insert is mounted into seats opening radially outwards (i.e., when using square shoulder facemills or facemills), then the cutting inserts represent a latent security risk, whenever the tool is run at a high rotation speed, in that the centrifugal force then becomes large.

The present invention aims at removing the above mentioned security risk and creating a cutting insert which in a reliable way is withheld in the appurtenant seat, even if the same under extreme conditions would tend to move radially outwards relative to the seat and the clamping element. A further object is to create a cutting insert that may be made of hard and sometimes brittle materials without running the risk of fracture if the same would be submitted to not only large centrifugal forces, but also large straining forces from the clamping element. It is also an object to create a cutting insert of a simple geometrical shape that makes possible a rational production by means of conventional production methods.

The present invention permits some or all of the foregoing objects to be achieved.

BRIEF ELUCIDATION OF PRIOR ART

In U.S. Pat. No. 5,658,101 a milling tool is disclosed that is suitable for the machining of wood or similar materials. The tool comprises a number of thin regrindable steel blades provided with cutting edges. The blades are clamped between, on the one hand, a support plate and, on the other hand, a clamping element in the form of a pressing plate that is pressable against the blade by means of a screw. In the blades with the cutting edge a through hole is provided. A male means in the form of a short tap is accommodated in the through hole and is coupled with the support plate. However, because the hole is a through hole, the hole may weaken a cutting insert intended for metal machining in an unacceptable way, such as where the insert is of the type that, on the one hand, is relatively small and, on the other hand, is made of materials that are considerably less tough than steel.

U.S. Pat. No. 4,396,315 discloses a cutting insert which, on a top side turned towards a clamping wedge, completely lacks any depression and which, on a bottom, side presents a conically shaped recess for receiving a fixing screw which is arranged to be tightened until it reaches the bottom of the conical recess. The purpose of this fixing screw is to position the cutting insert even after repeated grinding of the edges of the cutting insert. As a result of the screw being screwed down into the recess, the screw in its operative condition will not be smaller on all sides than the recess.

U.S. Pat. No. 5,558,142 discloses a cutting insert which in a topside has a depression which cooperates with a protrusion on a clamping wedge. This recess does not, however, have a V-shaped cross-sectional shape. Nor is the protrusion wedge-shaped in order to cooperate with a slanting flange surface in the manner stipulated by the present invention.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
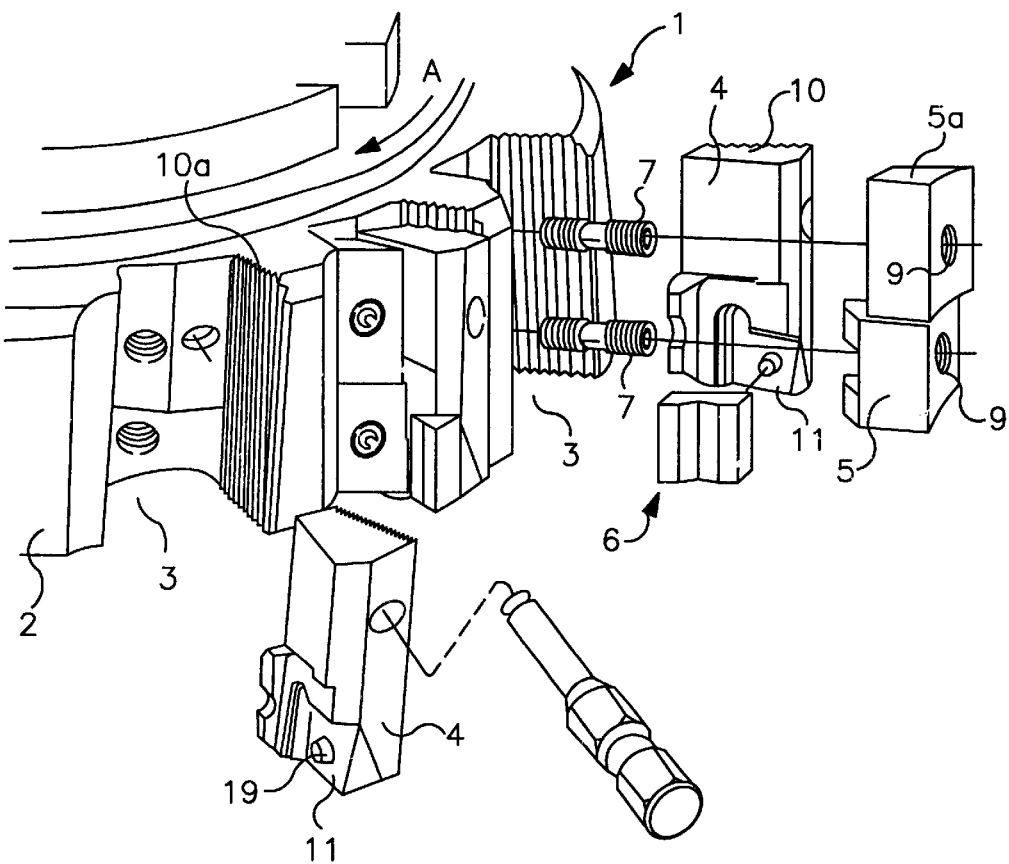
FIG. 1 is a perspective exploded view showing a part of a milling tool, more specifically of a square shoulder facemill, in which are included a number of cartridges and the appurtenant cutting inserts according to an embodiment of the present invention.

In FIG. 1, reference numeral 1 designates in general a milling cutter body that is rotatable around a central geometrical axis (not shown), more precisely in the direction of the arrow A. Recesses 3 opening radially outwards, for the accommodation of a cartridge 4, two clamping wedges 5, 5a and a cutting insert 6, according to the invention are provided in an envelope surface 2. The two clamping wedges 5, 5a cooperate with screws 7 which have double threads, of which one is tightenable in a hole 8 in the bottom of the recess 3 and the other in a threaded through hole 9 in the clamping wedge. The cartridge 4 has serrations 10, which engage, with corresponding serrations 1a in a trailing wall of the individual recess. A seat 11 for accommodating the cutting insert 6 is to be found on the leading side of the cartridge. The only purpose of the clamping wedge 5a is the clamping of the cartridge 4, while the clamping wedge 5 has the double purposes of on the one hand contributing to the clamping of the cartridge, and on the other hand also of clamping the cutting insert 6 into the seat 11.

Figure 2:
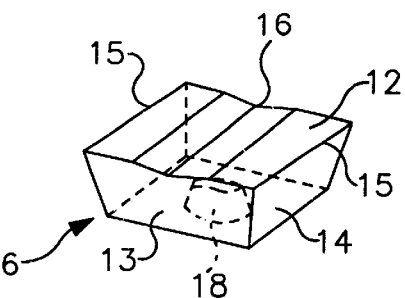
FIG. 2 is a perspective view of an individual cutting insert according to an embodiment of the present invention.
Figure 3:
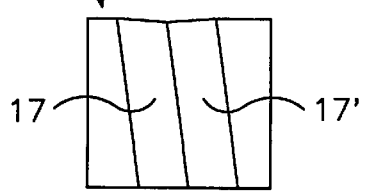
FIG. 3 is a planar top view of the cutting insert according to FIG. 2.
Figure 4:
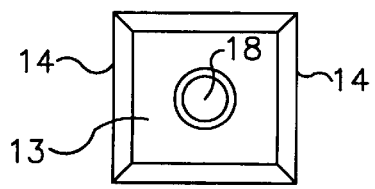
FIG. 4 is a planar bottom view of the cutting insert according to FIG. 2.

Reference is now made to FIGS. 2 to 4, where it can be seen that the cutting insert 6 delimited by a topside 12, a bottom side 13 and one or several relief surfaces 14 adjacent to edges or cutting edges 15.

According to the invention, a first depression in the shape of a groove 16 with a V-shaped cross-section is provided in the top side 12 of the cutting insert, which groove according to the example extends between opposed ends of the cutting insert. However, it is also feasible to form the depression with a length that is smaller than the length of the cutting insert, the depression in its entirety being surrounded by the planar top side or surface 12. The groove 16 is delimited by two planar flange surfaces 17, 17'. According to the example shown, the angle between these flange surfaces is 164°. In practice, this angle may vary, but it should lie within the range of 160 to 170°. It should also be noted that the groove 16 extends at a certain, restricted angle to the edges or cutting edges 15. According to the example, the oblique angle between the groove 16 and the edges 15 amounts to about 4.5°. However, this angle may vary upwards as well as downwards, the maximum value of the oblique angle amounting to 45°.

A female recess 18 ends in the bottom surface 13 of the cutting insert, which recess advantageously has the basic shape of a frustum of a cone. When the cutting insert is installed in the seat 11, a male means 19 engages into the recess 18. Also the male means 19 may advantageously have the shape of a frustum of a cone, although the male means is smaller than the recess on all sides. In other words, the male means has a smaller diameter and a smaller height than the recess 18. Therefore, under normal conditions, a free gap is created between the external surfaces of the male means and the internal surfaces of the recess 18. The recess 18 has a depth that as such may vary, but that in practice should not exceed half the thickness of the cutting insert.

Figure 5:
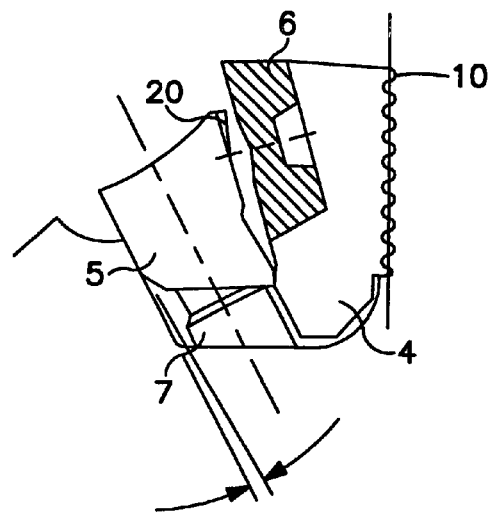
FIG. 5 is a partial, schematic side view showing a cartridge, a cutting insert and a clamping wedge in a first stage of function according to an embodiment of the present invention.
Figure 6:
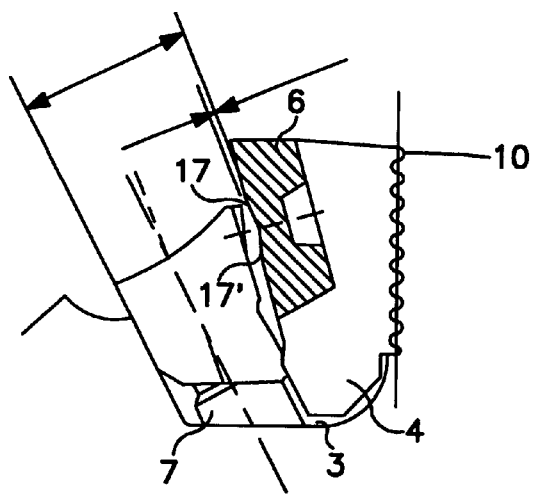
FIG. 6 is a side view corresponding to FIG. 5 showing the same components in a second stage of function.
Figure 7:
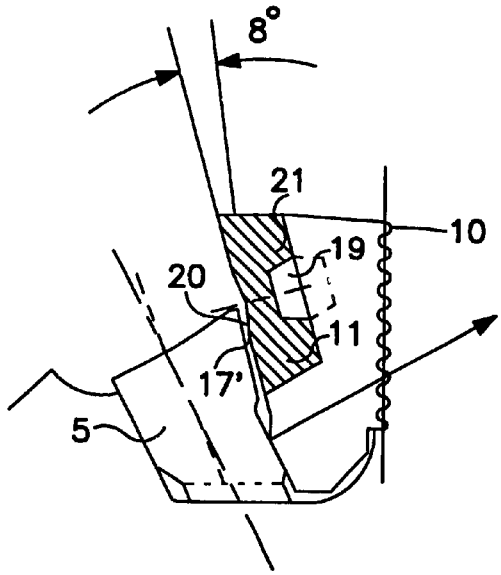
FIG. 7 is a third side view showing a third stage of function.

In FIGS. 5 to 7 three different stages of function for the clamping wedge 5 that has the function of clamping the cutting insert 6 are shown. As may be seen in all figures, the clamping wedge 5 has a protrusion 20 with a wedge-shaped cross-section the function of which is to cooperate with the cutting insert.

In FIG. 5 the clamping wedge 5 is shown in an outer end position, in which it lacks contact with the cartridge 4 as well as the cutting insert 6. In FIG. 6 is shown how the clamping wedge has been pulled in a bit into the recess 3 by means of the screw 7. At this stage, the cartridge 4 is clamped, but not the cutting insert 6, in that the protrusion 20 may freely pass at a distance from the flange surface 17 of the groove 16. In FIG. 7 the clamping wedge 5 is shown in a finally tightened stage, in which the protrusion 20 has come into contact with and been pressed against the flange surface 17'. At this stage, the cutting insert is fixed into the seat 11 of the cartridge. Thereby, mechanical male/female joints are created on the two opposed sides of the cutting insert. Thus, the protrusion 20 forms a male means that engages into the female depression or groove 16 in the topside of the cutting insert. At the same time, the male means 19 engages into the recess 18 in the bottom side of the cutting insert. However, since the male means 19 is smaller than the recess 18, an air gap 21 is formed between the external surfaces of the male means and the internal surfaces of the recess. This implies that, under normal conditions, the male means is not in active, mechanical engagement with the recess and, therefore, does not influence the ability of the cutting insert to exactly fit into the seat. Only if the cutting insert under extreme conditions should be exposed to such large centrifugal forces, that it would tend to move radially outwards relative to the clamping wedge and the cartridge, the male means will come in contact with the inside of the recess and hinder the cutting insert from being flung out radially from the seat.

The invention is not restricted solely to the embodiment as described above and shown in the drawings. Thus, the seat for the cutting insert may be located on other parts of a rotatable cutting tool than specifically in a cartridge of the type as exemplified in the drawings. Furthermore, the cutting insert and the appurtenant seat may be used for other rotatable cutting tools than just milling cutters. Further, other types of clamping elements than just clamping wedges may also be used for fixing the cutting insert into the appurtenant seat. Within the framework of the invention, it is also feasible to use a male means that may engage into a larger female recess in the cartridge or the tool part as shown by the phantom lines in FIG. 7, instead of a female recess in the bottom side of the cutting insert. It is even feasible to shape the bottom side of the cutting insert with on the one hand a female recess, and on the other hand a male means, for engagement with a male means and a female recess, respectively, in the tool part.

While this invention has been illustrated and described in accordance with a preferred embodiment, it is recognized that variations and changes may be made therein without departing from the invention as set forth in the claims.

What is claimed is:

1. A cutting insert for rotating cutting tools of the type intended for chip-breaking metal machining, the tools including a tool part with a seat opening radially outwards for accommodating the cutting insert, the cutting insert comprising: a top side, one or more cutting edges adjacent to the top side, a bottom side opposite the top side, and one or more relief surfaces extending between the top side and the bottom side, the cutting insert being arranged to be fixed into the seat by means of a clamping element that may be pressed against the top side, a female recess being formed in the bottom side adapted to cooperate with a corresponding male means in the tool part, the male means being smaller than the female recess so as to not actively engage mechanically in the female recess under normal conditions, and the top side includes a depression in the form of a groove with a V-shaped cross-section having planar flange surfaces adapted to receive a protrusion with a wedge-shaped cross-section on the clamping element.

2. Cutting insert according to claim 1, wherein the angle between the flange surfaces of the groove is within 160° to 170°.

3. A cutting insert for rotating cutting tools of the type intended for chip-breaking metal machining, the tools including a tool part with a seat opening radially outwards for accommodating the cutting insert, the cutting insert comprising: a top side, one or more cutting edges adjacent to the top side, a bottom side opposite the top side, and one or more relief surfaces extending between the top side and the bottom side, the cutting insert being arranged to be fixed into the seat by means of a clamping element that may be pressed against the top side, a male means being formed in the bottom side adapted to cooperate with a corresponding female recess in the tool part, the male means being smaller than the female recess so as to not actively engage mechanically in the female recess under normal conditions, and the top side includes a depression in the form of a groove with a V-shaped cross-section having planar flange surfaces adapted to receive a protrusion with a wedge-shaped cross-section on the clamping element.

4. Cutting insert according to claim 3, wherein the angle between the flange surfaces of the groove is within 160° to 170°.

5. Cutting insert according to claim 1, wherein the groove extends an entire length of the cutting insert.

6. Cutting insert according to claim 1, wherein a centerline of the groove defines an angle greater than 0° and less than 90° with one of the cutting edges.

7. Cutting insert according to claim 1, wherein the cutting insert has two cutting edges and is indexable.

8. Cutting insert according to claim 1, wherein the female recess has one or more side walls that taper inwardly in a direction away from the bottom side.

9. Cutting insert according to claim 1, wherein the portion of the bottom side around the female recess is substantially flat.

10. Cutting insert according to claim 1, wherein at least one of the one or more relief surfaces are substantially flat.

11. Cutting insert according to claim 3, wherein the groove extends an entire length of the cutting insert.

12. Cutting insert according to claim 3, wherein a centerline of the groove defines an angle greater than 0° and less than 90° with one of the cutting edges.

13. Cutting insert according to claim 3, wherein the cutting insert has two cutting edges and is indexable.

14. Cutting insert according to claim 3, wherein the male means has one or more side walls that taper inwardly in a direction away from the bottom side.

15. Cutting insert according to claim 3, wherein the portion of the bottom side around the male means is substantially flat.

16. Cutting insert according to claim 3, wherein at least one of the one or more relief surfaces are substantially flat.

* * * * *